(12) United States Patent
Maeno et al.

(10) Patent No.: US 6,481,900 B1
(45) Date of Patent: Nov. 19, 2002

(54) OPTICAL FERRULE

(75) Inventors: Koichi Maeno, Tokyo (JP); Takahiro Ueno, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 09/882,330

(22) Filed: Jun. 15, 2001

(51) Int. Cl.$^7$ ................................................. G02B 6/40
(52) U.S. Cl. ......................................................... 385/78
(58) Field of Search ............................ 389/78–88, 147; 264/1.7, 2.7, 272.15, 275; 425/116, 125, 190, 444

(56) References Cited

U.S. PATENT DOCUMENTS

| | | | | |
|---|---|---|---|---|
| 5,341,447 A | * | 8/1994 | Edwards et al. | 385/76 |
| 5,482,451 A | * | 1/1996 | Johnson et al. | 249/97 |
| 5,568,851 A | * | 10/1996 | Maes | 192/220 |
| 5,587,116 A | * | 12/1996 | Johnson et al. | 264/1.25 |

FOREIGN PATENT DOCUMENTS

| | | |
|---|---|---|
| EP | 0229495 | 7/1987 |
| EP | 1003055 | 5/2000 |
| GB | 2140323 | 11/1984 |
| JP | 5098069 | 4/1993 |
| JP | 5239353 | 9/1993 |
| JP | 5345328 | 12/1993 |
| JP | 6009881 | 1/1994 |
| JP | 06-299072 | 10/1994 |

* cited by examiner

*Primary Examiner*—Tulsidas Patel
(74) *Attorney, Agent, or Firm*—Knobbe Martens Olson & Bear LLP

(57) ABSTRACT

Provided is an optical ferrule which permits physical contact of optical fibers. The optical ferrule is an injection molded product of a resin composition comprising 100 parts by mass of a polyphenylene sulfide resin, 100 to 300 parts by mass of silica having a maximum grain size of 100 μm or smaller or 50 to 300 parts by mass of barium titanate.

3 Claims, 2 Drawing Sheets

OPTICAL FERRULE

BACKGROUND OF THE INVENTION

1. Field of the Invention

The present invention relates to an optical ferrule, and, more particularly, to an optical ferrule which can couple optical fibers in a detachable manner without causing an optical loss.

2. Prior Art

To connect optical fibers at the time of constructing an optical communication system, single-core optical ferrules which connect optical fibers using an adapter as shown in FIG. 1 or multi-core MT (Mechanically Transferable) optical ferrules as shown in FIG. 2 are used. Those ferrules are produced as resin moldings.

In the case of the MT optical ferrule shown in FIG. 2, for example, a ferrule body 1 is produced as an integrated molding having a plurality of optical-fiber insertion holes and guide pin holes 2 having a diameter of about 700 μm. In connecting optical fibers, the optical fibers are inserted into the optical-fiber insertion holes and securely adhered in the holes. Then, a connection end face 1a of each ferrule body 1 is mirror-polished using a lubricant containing, for example, diamond abrasive grains dispersed and a separate guide pin 3 is inserted into each guide pin hole 2. Then, the connection end faces of the ferrule bodies are connected to couple the optical fibers.

As the position of an optical fiber at the connection end face is positioned by the guide pins 3 in the case of the MT optical ferrule, the guide pin holes 2 should be formed with high precision at the time of molding the ferrule body 1. In the case where the position precision and size precision of the guide pin holes become lower, a deviation occurs between the optical axes of the optical fibers when the ferrule bodies are connected. This leads to an optical loss.

In the case of the single-core optical ferrule shown in FIG. 1, the connection precision of optical fibers is determined by the roundness, cylindricity and outside diameter of the periphery, the circularity of the optical-fiber insertion hole, the inclination of the optical-fiber insertion hole and so forth. This case also requires precise molding.

Conventional optical ferrules of those types have been manufactured by transfer molding of a thermosetting resin, such s epoxy resin, which has a small rate of shrinkage at the time of molding and a high size stability with time.

However, the transfer molding requires a time for a resin to be thermoset after it is fed into a mold, making the molding cycle longer. The transfer molding is therefore disadvantageous for mass production.

As a solution to this problem, an optical ferrule has appeared which is produced by using a polyphenylene sulfide resin which has an excellent size stability, fluidity and environment resistance and the injection molding that involves a short molding cycle.

In this case, to reduce the coefficient of thermal expansion of the optical ferrule, a large amount of silica is normally filled in the polyphenylene sulfide resin, yielding a resin composition which is in turn molded.

When the connection end face of the optical ferrule produced from such a material (resin composition) is polished, however, the filled silica is likely to come off at the time of polishing. This makes it difficult to provide a smooth end face.

One way to prevent silica from coming off is to subject silica to a surface treatment with a silane coupling agent before it is filled in the resin and use a mixture of spherical silica and irregular-shaped silica as the silica, as proposed in, for example, Japanese Unexamined Patent Publication No. Hei 6-299072.

The prior art still has the following problems.

First, the smoothness of the connection end face after polishing may not be sufficient so that the physical contact of the polished end faces of optical ferrules alone makes it difficult to realize proper optical coupling of optical fibers.

In connecting optical ferrules, therefore, conventionally a refractive-index matching agent, such as silicone grease, is coated on the polished end face to thereby prevent the refractive index from changing or the optical loss from occurring due to the contact of the optical path formed by the optical fibers with the air.

It is however necessary to carefully perform the work of coating the refractive-index matching agent in such a way that, for example, dust or the like does not enter the coated portion. Depending on the coating work, bubbles may be formed in the coated portion, resulting in a considerably large optical loss. In view of the above, there is a demand for development of optical ferrules which do not use a refractive-index matching agent or do not produce a clearance between optical fibers even when they are rendered in physical contact with each other, and do not cause an optical loss.

In consideration of the physical contact of the optical ferrule, an end portion of an optical fiber should protrude from the polished end face by about 3 to 5 μm.

In the case of the above-described optical ferrule, however, a large amount of silica which has about the same hardness as the optical fiber is filled in the resin, the polished end face itself is hard so that at the time of polishing, the optical fiber is polished out and so is the polished end face. This may make the extension length of the polished optical fiber considerably shorter than the aforementioned value. In such a case, a clearance is formed in the connecting portion of the optical fibers, which leads to a significantly large optical loss.

It is known that at the time of polishing the end face of the optical ferrule, so-called edge chipping or chipping of the edge of an optical fiber appearing on the polished end face occurs. Because the polished end face is very hard, the polishing time becomes longer and the amount of abrasive grains increases. This results in an increased manufacturing cost.

OBJECT AND SUMMARY OF THE INVENTION

Accordingly, it is an object of the present invention to provide an optical ferrule which overcomes the aforementioned problems of the conventional optical ferrules, has a very smooth polished end face and a proper extension length of an optical fiber after the end face is polished, does not suffer edge chipping of the optical fiber, can ensure connection without using a refractive-index matching agent and has a low optical loss between optical fibers even after connection.

To achieve the object, according to the present invention, there is provided an optical ferrule which is a molded product of a resin composition comprising 100 parts by mass of a polyphenylene sulfide resin, 100 to 300 parts by mass of silica having a maximum grain size of 100 μm or smaller and 50 to 300 parts by mass of barium titanate.

It is preferable that in the optical ferrule, the silica should be spherical silica, the polyphenylene sulfide resin should be formed of linear polyphenylene sulfide, and the resin composition should essentially consist of 100 parts by mass of a linear polyphenylene sulfide resin, 100 to 200 parts by mass of spherical silica having a maximum grain size of 50 μm or smaller and 150 to 250 parts by mass of barium titanate.

DETAILED DESCRIPTION OF THE INVENTION

Figure 1:
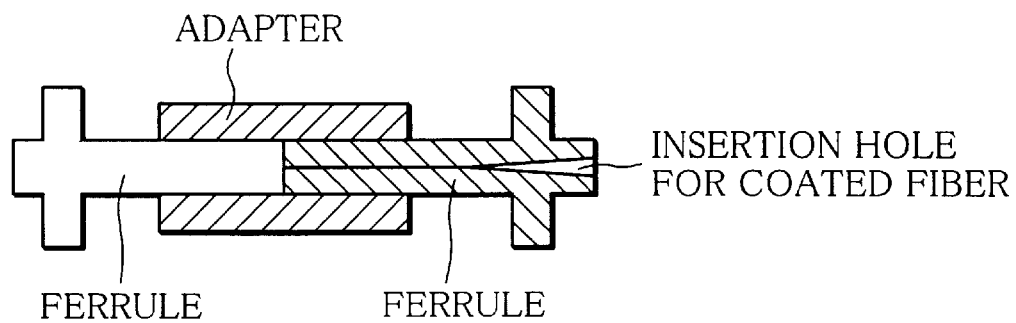
FIG. 1 is a partly cross-sectional view showing the connecting portion of single-core optical ferrule.

An optical ferrule according to the present invention is produced by molding a resin composition essentially containing as essential components a polyphenylene sulfide resin, silica and barium titanate. Specifically, the molded product is preferably produced by injection molding.

It is preferable that the polyphenylene sulfide resin as a base resin be a linear polyphenylene sulfide resin for the following advantages.

Even with a low viscosity, a linear polyphenylene sulfide resin is unlikely to produce burrs on a molded product at the time of injection molding and has high tenacity, so that the breakdown strength of the optical-fiber insertion holes and guide pin holes of the molded optical ferrule becomes high. Further, the hygroscopicity is low and there is a little size variation even under a high temperate and high humidity atmosphere, so that a variation in connecting loss after the optical ferrules are connected is low.

In general, a polyphenylene sulfide resin can be synthesized by polymerizing the resin until a polymerization reaction makes it insoluble, by polymerizing the resin until thermal crosslinking makes it insoluble, by a treatment using a crosslinking agent, such as hydrogen peroxide. A linear polyphenylene sulfide resin, which is a preferable resin in the present invention, is a resin synthesized as a linearly polymerized resin without undergoing a heat treatment in the aforementioned synthesizing process.

Such a lineal polyphenylene sulfide resin is a linearly polymerized resin that shows a peak top value of 20000 to 40000 in the molecular weight distribution which is measured by gel permeation chromatography using 1-chloronapthalene as a solvent at 230 to 290° C., and an example of the resin is T-1 (product name), a product of DIC EP Inc.

Silica is classified into spherical silica and irregular-shaped silica by its shape. Although the present invention can use either silica or a mixture of both types, it is preferable to use spherical silica.

Spherical silica is produced by the so-called verneuil's method that pulverizes a natural silica rock or crystal with a ball mill or the like, sprays the pulverized powder in, for example, an LPG-oxygen flame so that the grains are melted and liquidated and formed into a spherical shape by surface tension. An example of such spherical silica is an FB series produced by Denki Kagaku Kogyo Kabushiki Kaisha.

Examples of irregular-shaped silica re crystalline silica (e.g., Crystalite produced by Tatsumori Ltd.) which is acquired by pulverizing a natural silica rock and adjusting the pulverized powder to have a predetermined grain distribution and molten silica (e.g., Fuselex produced by Tatsumori Ltd.) which is acquired by fusing a natural silica rock and then pulverizing the fused silica rock. Those irregular-shaped silicas have grains of different sizes and complex undulated surfaces and generally have square shapes.

Spherical silica has a spherical shape and has a smaller specific surface area than irregular-shaped silica. Even if a relatively large amount of spherical silica is blended in the polyphenylene sulfide resin, therefore, an increase in the viscosity of the acquired resin composition is smaller than that in the case where irregular-shaped silica is blended in the polyphenylene sulfide resin so that the resin composition is suitable for injection molding.

Ensuring mixture of a relatively large amount of silica with an increase in viscosity suppressed reduces the coefficient of thermal expansion of the molded optical ferrule. Therefore, the use of spherical silica is suitable as it brings about advantages of securing the size stability and making an optical loss hard to occur, even if the connecting portion undergoes a temperature change when the manufactured optical ferrules are connected.

When the resin composition is prepared by blending the silica into the polyphenylene sulfide resin, the resin composition takes a sea-island structure having a polyphenylene sulfide resin as a sea component and silica as island components. In this case, if the island components are large in size and in number, the probability of maldistribution of island components in an arbitrary area of the sea-island structure becomes high, thus reducing the homogeneity of the sea-island structure. Therefore, the rate of shrinkage of the molded product of the resin composition is not uniform over the entire area and partially varies. This lowers the quality stability of the molded product.

In view of the above, it is preferable that silica which becomes island components should have a maximum grain size of 100 μm or smaller. More preferably, the maximum grain size is 50 μm or smaller.

It should be noted that the maximum grain size is the maximum grain size detected by using a laser diffraction scattering type grain-size analyzer when spherical silica is used. An example of the analyzer is a microtrack SRA series of Nikkiso Co., Ltd.

The blending amount of silica is set to 100 to 300 parts by mass with respect to 100 parts by mass of the polyphenylene sulfide resin.

When the blending amount becomes smaller than 100 parts by mass, the strength characteristic of the molded optical ferrule drops so that when the optical ferrule is chucked at the time of polishing the end face, for example, the polished end face is deformed, making it difficult to acquire the proper extension length of an optical fiber and increasing the rate of shrinkage at the time of molding. When the blending amount becomes greater than 300 parts by mass, the melting viscosity of the resin composition becomes high so that the injection pressure into the mold becomes too high. This lowers the precision of the molded product.

When a linear polyphenylene sulfide resin is used as the polyphenylene sulfide resin and silica in use has a maximum grain size of 50 μm or smaller, it is preferable that the blending amount of silica be set to 100 to 200 parts by mass with respect to 100 parts by mass of the linear polyphenylene sulfide resin.

The other essential component, barium titanate, is blended for the following reason. That is, phenomena such as damages on the optical fiber end face and improper extension length which occurred in the case where the optical fiber blended only with silica having substantially the same Mohs' hardness as that of the optical fiber was subjected to end face polishing, can be released. Because of the Mohs' hardness of barium titanate is lower than that of the optical fiber and silica, barium titanate is polished more easily than an optical fiber and silica at the time of end face polishing. Therefore, the extension length of an optical fiber seems to depend on the surface area of silica exposed on the polished end face. Further, edge chipping of an optical fiber seems to occur as silica that comes off at the time of polishing sticks on the polishing plate and damages the optical fiber. It is therefore possible to properly control the extension length of an optical fiber while suppressing the shrinkage of a molded product by blending barium titanate of a low hardness and blending an adequate amount of silica.

The blending amount of barium titanate is set to 50 to 300 parts by mass with respect to 100 parts by mass of the polyphenylene sulfide resin.

When the blending amount of barium titanate becomes smaller than 50 parts by mass, the strength characteristic of the molded optical ferrule drops so that deformation may occur at the time of polishing the end face, as in the case of silica, and the aforementioned effects will not be demonstrated sufficiently. When the blending amount becomes greater than 300 parts by mass, the moldability of the resin composition is deteriorated, making it hard to provide an optical ferrule having a high size precision.

In manufacturing the optical ferrule of the present invention, besides the aforementioned components, other materials can be used within the scope of the present invention. Specific examples of such materials are calcium stannate, calcium titanate and bismuth stannate.

EXAMPLES

Examples 1 to 9 and comparative examples 1 to 13

(1) Preparation of the resin composition for an optical ferrule

First, the following materials for the resin composition were prepared.

A. Base resin $A_1$: T-1 (product name; linear polyphenylene sulfide resin produced by DIC EP Inc. and having a viscosity of 30 Pa·sec (300° C.))

$A_2$: T-2 (product name; linear polyphenylene sulfide resin produced by DIC EP Inc. and having a viscosity of 60 Pa·sec (300° C.))

$A_3$: K-1 (product name; crosslinking polyphenylene sulfide resin produced by DIC EP Inc. and having a viscosity of 35 Pa·sec (300° C.))

B. Silica $B_1$: FB-5SDX (product name; spherical silica produced by Denki Kagaku Kogyo Kabushiki Kaisha and having a mean grain size of 4.5 μm and a maximum grain size of 20 μm)

$B_2$: S10-01 (product name; spherical silica produced by Micron Co., Ltd. and having a mean grain size of 10.7 μm and a maximum grain size of 50 μm)

$B_3$: MSR-3500 (product name; spherical silica produced by Tatsumori Ltd. and having a mean grain size of 20.1 μm and a maximum grain size of 74 μm)

$B_4$: MCF-200C (product name; irregular-shaped silica produced by Tatsumori Ltd. and having a mean grain size of 10.7 μm and a maximum grain size of 96 μm)

C. Barium titanate $C_1$: BT-100M (product name and produced by Fuji Titanium Industry Co., Ltd.; about 98% or more of $BaTiO_3$)

$C_2$: BT-206 (product name and produced by Fuji Titanium Industry Co., Ltd.; about 90% of $BaTiO_3$ and about 10% of $CaSnO_3$)

$C_3$: BT-305 (product name and produced by Fuji Titanium Industry Co., Ltd.; about 85% of $BaTiO_3$, about 5% of $CaTiO_3$ and about 10% of $Bi_2(SnO_3)_3$)

The aforementioned materials were fed in the ratios given in Table 1 into an extruder whose cylinder temperature was set to 300 to 340° C. and kneaded, yielding pellets of the individual resin compositions.

TABLE 1

| | Composition | | | | | | |
|---|---|---|---|---|---|---|---|
| | Base resin | | Silica | | Barium titanate | | |
| | Type | Ratio (parts by mess) | Type | Ratio (parts by mess) | Type | Ratio (parts by mess) | Remark |
| Composition $D_1$ | $A_1$ | 100 | $B_1$ | 150 | $C_1$ | 200 | Example |
| Composition $D_2$ | $A_2$ | 100 | $B_1$ | 150 | $C_1$ | 200 | Example |
| Composition $D_3$ | $A_3$ | 100 | $B_1$ | 150 | $C_1$ | 200 | Example |
| Composition $D_4$ | $A_1$ | 100 | $B_2$ | 150 | $C_1$ | 200 | Example |
| Composition $D_5$ | $A_1$ | 100 | $B_3$ | 150 | $C_1$ | 200 | Example |
| Composition $D_6$ | $A_1$ | 100 | $B_4$ | 150 | $C_1$ | 200 | Example |
| Composition $D_7$ | $A_1$ | 100 | $B_1$ | 150 | $C_2$ | 200 | Example |
| Composition $D_8$ | $A_1$ | 100 | $B_1$ | 150 | $C_3$ | 200 | Example |
| Composition $D_9$ | $A_1$ | 100 | $B_1$ | 200 | $C_1$ | 100 | Example |
| Composition $D_{10}$ | $A_1$ | 100 | $B_1$ | 100 | $C_1$ | 300 | Example |
| Composition $D_{11}$ | $A_1$ | 100 | $B_1$ | 250 | — | — | Comparative example |
| Composition $D_{12}$ | $A_1$ | 100 | — | — | $C_1$ | 300 | Comparative example |
| Composition $D_{13}$ | $A_1$ | 100 | $B_1$ | 350 | $C_1$ | 200 | Comparative example |
| Composition $D_{14}$ | $A_1$ | 100 | $B_2$ | 50 | $C_1$ | 100 | Comparative example |
| Composition $D_{15}$ | $A_2$ | 100 | $B_1$ | 150 | $C_1$ | 350 | Comparative example |

(2) Evaluation of characteristics

The characteristics of the resin compositions given in Table 1 and the characteristics of optical ferrules molded using those resin compositions were evaluated according to the following specifications.

(1) Melting viscosity of resin composition

The melting viscosities of those resin compositions were measured in conformity with the measuring method defined by ASTM D3835. Specifically, each resin composition was placed in a shearing strength measuring machine having a depth of 30 mm, a capillary hole size of 1.0 mm and a piston diameter of 12 mm and heated and melted at 340° C. and the melting viscosity was measured at a shearing speed of 900 [1/sec]

(2) Rate of shrinkage of molding

The pellet of each resin composition was injection-molded in a mold whose temperature was controlled to 170° C. at 340° C. and injection pressure of 60 MPa, thus forming a sheet having target sizes of 50 mm in length, 50 mm in width and 2 mm in thickness. Then, the ratio of change with respect to the designed size of the mold was computed as the rate of shrinkage. The target rate of shrinkage was set to 0.6% or less.

(3) Extension length of optical fiber and rate of occurrence of edge chipping

Figure 2:
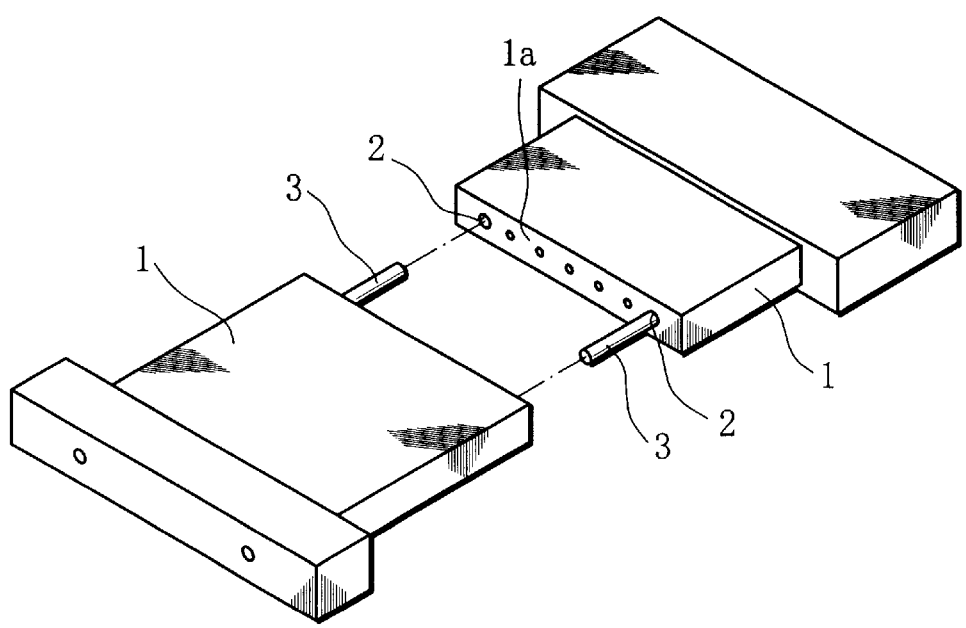
FIG. 2 is a perspective view showing MT optical ferrules.

The pellet of each resin composition was injection-molded in a mold for the optical ferrule body 1 shown in FIG. 2 at a temperature of 340° C.

Optical fibers were inserted in the optical-fiber insertion holes in the acquired optical ferrule body 1 and were secured adhered by an epoxy resin adhesive.

Then, the optical ferrule body was secured by a collect chuck, and its end faces was made to contact the face of a grinder of No. 4000 at a given load of 10 N, polished for one minute using a lubricant containing artificial diamond abrasive grains as a medium, and then subjected to buffing for one minute.

The extension length of the optical fiber from the polished end face was measured by a surface-roughness measuring instrument. The target extension length was set to 3 to 5 μm.

The edge chipping of the optical fiber at the polished end face was examined by an optical microscope have a 50x magnification. Then, the percentage of the number of optical fibers having edge chipping with respect to the total number of optical fibers was calculated as the rate of occurrence of edge chipping. The target rate of occurrence of edge chipping was set to 20% or less.

(4) Modulus in flexure

The pellet of each resin composition was injection-molded at a temperature of 340° C. to produce a sample piece having a length of 80 mm, width of 10 mm and thickness of 4 mm and the modulus in flexure was measured in conformity with the measuring method defined by ASTM D790M. The target modulus in flexure was set to 1.3 GPa or greater.

(5) Flexural strength

The pellet of each resin composition was injection-molded at a temperature of 340° C. to produce a sample piece having a length of 80 mm, width of 10±0.5 mm and thickness of 4±0.2 mm and the flexural strength was measured in conformity with the measuring method defined by ASTM D790M. The target flexural strength was set to 100 MPa or greater.

(6) Strength of guide pin holes

Figure 3:
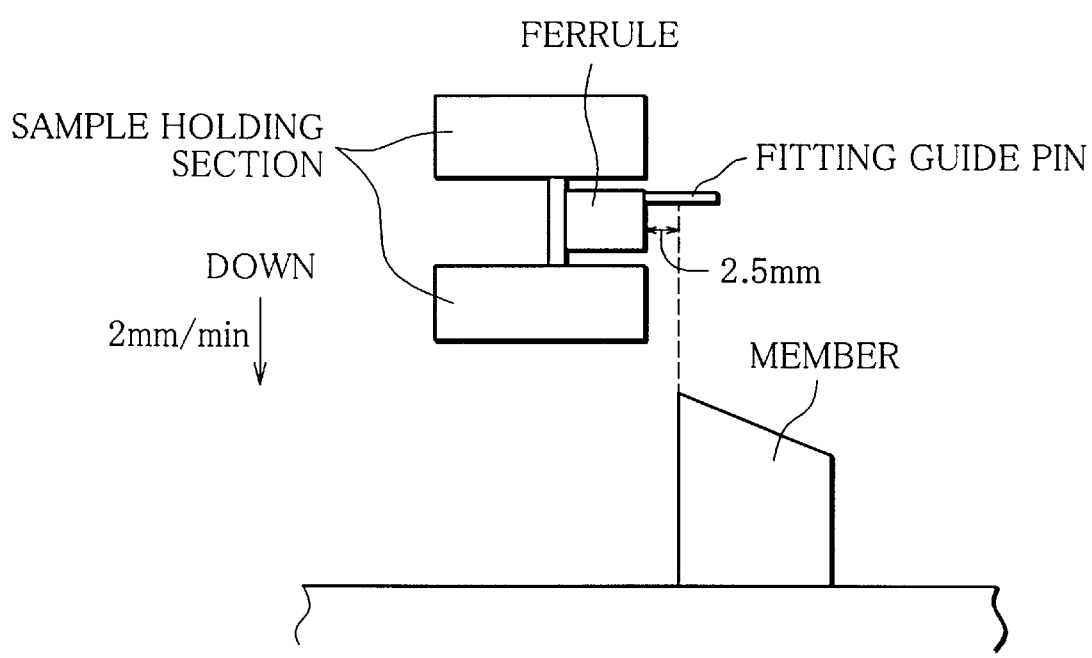
FIG. 3 is an explanatory diagram illustrating how to measure the strength of guide pin holes of the MT optical ferrule.

The pellet of each resin composition was injection-molded at a temperature of 340° C. to produce the optical ferrule body 1 shown in FIG. 2. The guide pins 3 were inserted into the guide pin holes 2 of the optical ferrule body 1 to the depth of 4 mm with the remaining portion protruding, the optical ferrule body 1 was held by a sample holding section of an apparatus as shown in FIG. 3, and the sample holding section was moved downward at a speed of 2 mm/min. Then, the portions of the protruding guide pins 3 at 2.5 mm from the end face of the optical ferrule body 1 were abutted against the sharp portion of a member, and the load at which the guide pin holes 2 were broken was measured. The value of the load then was taken as the strength of the guide pin holes. The target strength of the guide pin holes was set to 19.6 N or greater.

(7) Coefficient of linear thermal expansion

Each coefficient of mean linear thermal expansion at a temperature lower than 80° C. and equal to or lower than the glass-transition temperature (Tg) was computed by the measuring method defined by ASTM D696. The target value for the coefficient of mean linear thermal expansion was set to $3 \times 10^{-5}$ [1/°C.] or smaller.

The results mentioned above are given in Table 2.

TABLE 2

| | | | Characteristics | | | | | | |
| --- | --- | --- | --- | --- | --- | --- | --- | --- | --- |
| | Type of resin composition | Melting viscosity (Pa · sec) | Rate of shrinkage of molding (%) | Extension length (μm) | Rate of occurrence of edge chipping (%) | Modulus in flexure (GPa) | Flexural strength (MPa) | Strength of guide pin holes (N) | Coefficient of linear thermal expansion ($\times 10^{-5}$ [1/° C.]) |
| Example 1 | $D_1$ | 280 | 0.45 | 3.6 | 6 | 18.1 | 120 | 24.9 | 1.9 |
| Example 2 | $D_2$ | 620 | 0.50 | 3.8 | 6 | 17.3 | 140 | 30.4 | 1.9 |
| Example 3 | $D_3$ | 370 | 0.45 | 3.0 | 10 | 18.0 | 100 | 23.3 | 1.9 |
| Example 4 | $D_4$ | 300 | 0.45 | 3.5 | 8 | 19.2 | 120 | 28.4 | 1.9 |
| Example 5 | $D_5$ | 300 | 0.45 | 3.5 | 6 | 17.3 | 120 | 27.8 | 1.9 |
| Example 6 | $D_6$ | 320 | 0.50 | 3.0 | 18 | 17.6 | 140 | 26.8 | 1.9 |
| Example 7 | $D_7$ | 300 | 0.45 | 3.4 | 8 | 17.6 | 120 | 28.0 | 1.9 |
| Example 8 | $D_8$ | 320 | 0.45 | 3.4 | 8 | 17.0 | 120 | 25.4 | 1.9 |
| Example 9 | $D_9$ | 350 | 0.45 | 3.2 | 10 | 16.7 | 140 | 30.5 | 1.8 |
| Example 10 | $D_{10}$ | 270 | 0.55 | 3.5 | 6 | 17.3 | 150 | 30.5 | 2.1 |
| Comparative Example 1 | $D_{11}$ | 210 | 0.55 | 2.2 | 72 | 14.9 | 150 | 38.7 | 2.0 |
| Comparative Example 2 | $D_{12}$ | 340 | 0.75 | 4.8 | 16 | 18.2 | 150 | 24.6 | 2.5 |
| Comparative Example 3 | $D_{13}$ | 1100 | Molding could not be conducted due to very high melting viscosity | | | | | | |
| Comparative Example 4 | $D_{14}$ | 260 | 0.80 | 6.0 | 8 | 19 | 150 | 26.3 | 2.6 |
| Comparative Example 5 | $D_{15}$ | 1300 | Molding could not be conducted due to very high melting viscosity | | | | | | |

The following are apparent from Tables 1 and 2.

(1) In the case of the comparative example 1 produced by using the resin composition $D_{11}$ having only spherical silica blended, the mechanical characteristics, such as the modulus in flexure, are not much inferior to those of the examples, but the extension length of an optical fiber which is 2.2 μm does not reach the target value and the rate of occurrence of edge chipping which is 72% is extremely high. Therefore, blending silica alone makes it very hard for the extension length and the rate of occurrence of edge chipping to achieve the target values.

(2) In the case of the comparative example 2 produced by using the resin composition $D_{12}$ having only barium titanate blended, the extension length, the rate of occurrence of edge chipping and the mechanical characteristics are not much inferior to those of the examples, but the rate of shrinkage of the molded product which is 0.75% is way off the target value, thus lowering the size precision.

(3) The resin composition $D_{13}$ whose spherical silica content blended is larger than the amount defined by the present invention and the resin composition $D_{15}$ whose barium titanate content blended is larger than the amount defined by the present invention both have extremely high melting viscosities and cannot be injection-molded.

(4) In the case of the comparative example 4 produced by using the resin composition $D_{14}$ whose spherical silica content blended is smaller than the amount defined by the present invention, the extension length of the optical fiber exceeds the target value and the rate of shrinkage of the molded product which is 0.8% is far off the target value.

(5) Examples 1 to 10 have extension lengths of 3 μm or longer which can sufficiently ensure physical contact and have rates of occurrence of edge chipping lying within 20%, which leads to a high production yield. The modulus in flexure, the flexural strength, the strength of guide pin holes and the coefficient of liner thermal expansion all achieve the target values.

It is apparent from the above description that as the optical ferrule of the present invention is formed of a resin composition which essentially consists of, preferably, a linear polyphenylene sulfide resin, silica and barium titanate, and the optical ferrule has a high size precision, the proper extension length of an optical fiber after the end face is polished and has a low rate of occurrence of edge chipping. When the end faces of optical ferrules are connected together by physical contact, therefore, an optical loss does not occur between optical fibers and detachable physical contact can be ensured.

Because of the excellent mechanical strengths, in the case of an MT optical ferrule, for example, the guide pin holes are not easily broken even if attachment and detachment via the guide pins are repeated.

What is claimed is:

1. An optical ferrule which is a molded product of a resin composition comprising 100 parts by mass of a polyphenylene sulfide resin, 100 to 300 parts by mass of silica having a maximum grain size of 100 μm or smaller and 50 to 300 parts by mass of barium titanate in terms of a relative mass ratio.

2. The optical ferrule according to claim 1, wherein said silica is spherical silica.

3. The optical ferrule according to claim 1, wherein said polyphenylene sulfide resin is formed of linear polyphenylene sulfide, said silica is spherical silica, and said resin composition comprising 100 parts by mass of a linear polyphenylene sulfide resin, 100 to 200 parts by mass of spherical silica having a maximum grain size of 50 μm or smaller and 150 to 250 parts by mass of barium titanate in terms of a relative mass ratio.

* * * * *